United States Patent
Conklin

(10) Patent No.: US 9,432,682 B2
(45) Date of Patent: *Aug. 30, 2016

(54) SYSTEM AND METHOD FOR INTRACODING VIDEO DATA

(71) Applicant: Intel Corporation, Santa Clara, CA (US)

(72) Inventor: Gregory J. Conklin, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,349

(22) Filed: Dec. 24, 2013

(65) Prior Publication Data

US 2014/0105292 A1    Apr. 17, 2014

Related U.S. Application Data

(60) Division of application No. 13/679,957, filed on Nov. 16, 2012, now Pat. No. 8,908,764, which is a continuation of application No. 12/767,744, filed on Apr. 26, 2010, now Pat. No. 8,385,415, which is a (Continued)

(51) Int. Cl.
| | |
|---|---|
| *H04N 7/12* | (2006.01) |
| *H04N 19/50* | (2014.01) |
| *H04N 19/593* | (2014.01) |
| *H04N 19/513* | (2014.01) |

(52) U.S. Cl.
CPC ............ *H04N 19/50* (2014.11); *H04N 19/513* (2014.11); *H04N 19/593* (2014.11)

(58) Field of Classification Search
CPC .. H04N 19/176; H04N 19/593; H04N 19/61; H04N 19/11; H04N 19/46
USPC .................. 375/240.01–240.29; 382/232
See application file for complete search history.

(56) References Cited

U.S. PATENT DOCUMENTS

| | | | |
|---|---|---|---|
| 4,383,272 | A | 5/1983 | Netravali et al. |
| 4,466,714 | A | 8/1984 | Dyfverman |

(Continued)

FOREIGN PATENT DOCUMENTS

| | | |
|---|---|---|
| EP | 294957 A2 | 12/1988 |
| EP | 391094 A2 | 10/1990 |

(Continued)

OTHER PUBLICATIONS

Antiila et al., "Transferring real-time video on the Internet", www.tml.hut.fi/Opinnot/Tik-110.551/1997/iwsem.html, printed Aug. 4, 2000.

(Continued)

*Primary Examiner* — Gims Philippe
(74) *Attorney, Agent, or Firm* — Green, Howard & Mughal LLP

(57) ABSTRACT

A video system for coding a stream of video data that includes a stream of video frames divides each video frame into a matrix of a plurality of subblocks, wherein each subblock includes a plurality of pixels. The video system operates in accordance with nine prediction modes. Each prediction mode determines a prediction mode according to which a present subblock is to be coded. One of the nine prediction modes is selected to encode the present subblock, wherein the selected prediction mode provides for a minimum error value in the present subblock.

24 Claims, 5 Drawing Sheets

Related U.S. Application Data continuation of application No. 10/848,992, filed on May 18, 2004, now Pat. No. 7,706,444, which is a continuation of application No. 09/732,522, filed on Dec. 6, 2000, now Pat. No. 6,765,964.

(56) References Cited

U.S. PATENT DOCUMENTS

| | | |
|---|---|---|
| 4,862,259 A | 8/1989 | Gillard et al. |
| 4,862,260 A | 8/1989 | Harradine et al. |
| 4,864,393 A | 9/1989 | Harradine et al. |
| 4,864,394 A | 9/1989 | Gillard |
| 4,864,398 A | 9/1989 | Avis et al. |
| 4,967,271 A | 10/1990 | Campbell et al. |
| 5,020,121 A | 5/1991 | Rosenberg |
| 5,313,281 A | 5/1994 | Richards |
| 5,398,068 A | 3/1995 | Liu et al. |
| 5,410,358 A | 4/1995 | Shackleton et al. |
| 5,467,086 A | 11/1995 | Jeong |
| 5,546,477 A | 8/1996 | Knowles et al. |
| 5,568,200 A | 10/1996 | Pearlstein et al. |
| 5,592,226 A | 1/1997 | Lee et al. |
| 5,615,287 A | 3/1997 | Fu et al. |
| 5,642,239 A | 6/1997 | Nagai |
| 5,677,735 A | 10/1997 | Ueno et al. |
| 5,699,128 A | 12/1997 | Hayashi |
| 5,699,499 A | 12/1997 | Kawada et al. |
| 5,734,435 A | 3/1998 | Wilson et al. |
| 5,742,343 A | 4/1998 | Haskell et al. |
| 5,748,248 A | 5/1998 | Parke |
| 5,786,864 A | 7/1998 | Yamamoto |
| 5,831,677 A | 11/1998 | Streater |
| 5,838,828 A | 11/1998 | Mizuki et al. |
| 5,943,090 A | 8/1999 | Eiberger et al. |
| 5,974,177 A | 10/1999 | Krtolica |
| 5,995,154 A | 11/1999 | Heimburger |
| 5,999,173 A | 12/1999 | Ubillos |
| 6,067,321 A | 5/2000 | Lempel |
| 6,072,833 A | 6/2000 | Yamauchi |
| 6,084,908 A | 7/2000 | Chiang et al. |
| 6,101,282 A | 8/2000 | Hirabayashi et al. |
| 6,125,144 A | 9/2000 | Matsumura et al. |
| 6,130,912 A | 10/2000 | Chang et al. |
| 6,141,449 A | 10/2000 | Kawada et al. |
| 6,148,109 A * | 11/2000 | Boon et al. ............ 382/238 |
| 6,157,396 A | 12/2000 | Margulis et al. |
| 6,181,382 B1 | 1/2001 | Kieu et al. |
| 6,185,329 B1 | 2/2001 | Zhang et al. |
| 6,208,760 B1 | 3/2001 | De Haan et al. |
| 6,222,885 B1 | 4/2001 | Chaddha et al. |
| 6,256,068 B1 | 7/2001 | Takada et al. |
| 6,408,096 B2 | 6/2002 | Tan |
| 6,421,386 B1 | 7/2002 | Chung et al. |
| 6,426,976 B1 | 7/2002 | Wen et al. |
| 6,519,005 B2 | 2/2003 | Bakhmutsky et al. |
| 6,556,197 B1 | 4/2003 | Van Hook et al. |
| 6,556,718 B1 | 4/2003 | Piccinelli et al. |
| 6,654,420 B1 | 11/2003 | Snook |
| 6,690,728 B1 | 2/2004 | Chang et al. |
| 6,765,964 B1 | 7/2004 | Conklin |
| 8,385,415 B2 | 2/2013 | Conklin |
| 2013/0077683 A1 | 3/2013 | Conklin |

FOREIGN PATENT DOCUMENTS

| | | |
|---|---|---|
| EP | 596732 A1 | 5/1994 |
| EP | 634871 A2 | 1/1995 |
| EP | 781041 A1 | 6/1997 |
| EP | 883298 A2 | 12/1998 |
| JP | 4-352189 B2 | 10/2009 |
| WO | 99/25122 A2 | 5/1995 |
| WO | 97/46020 A2 | 12/1997 |
| WO | 99/52281 A2 | 10/1999 |

OTHER PUBLICATIONS

Bjontegaard, "Video Coding Experts Group (Question 15)", ITU-Telecommunications Standardization Sector, Document Q15-F-11, Sixth Meeting: Seal, Korea, Nov. 3-6, 1998.

Bjontegaard, "Video Coding Experts Group (Question 15)", ITU-Telecommunications Standardization Section, Document Q15-J-72, Tenth Meeting: Osaka, May 16-18, 2000.

ITU-Telecommunication Standardization Sector, Study Group 16, "MVC Decoder Description", Study Period 1997-2000, Geneva, Feb. 7-18, 2000.

Sadka et al., "Error Performance Improvement in Block-Transform Video Coders", www.research.att.com/mrc/pv99/contents/papers/sadka/sadka.htm, printed Aug. 4, 2000.

Wiseman, "An Introduction to MPEG Video Compression," members.aol.com/symbandgrl., printed Apr. 14, 2000.

Bjontegaard, "H. 26L Test Model Long Term 8 {TML-8) draftO," ITU Study Group 16, Apr. 2, 2001, pp. 1-2, 16-19.

"Working Draft No. 2, Revision 0 (WD-2)," Document JVT-B118, Dec. 3, 2001, pp. 1 ,3-100; p. 27, paragraph 4.4.4-p. 32, paragraph 4.4.5.

Yutaka, "Improved Intra Coding with DC/AC Prediction", ISO/IEC JTC1/SC29/WG11 Coding of Moving Pictures and Associated Audio Information ISO!IEC JTC1/SC29/WG11 MPEG96/806, Mar. 1996.

Baxes, Digital Image Processing: Principles and Applications, John Wiley & Sons, 1994. pp. 88-91.

Blume, "New Algorithm for Nonlinear Vector-Based Upconversion with Center Weighted Medians", Journal of Electronic Imaging 6(3), Jul. 1997, pp. 368-378.

Blume, "Nonlinear Vector Error Tolerant Interpolation of Intermediate Video Images by Weighted Medians", Signal Processing Image Communication, val. 14, Search Report PCTUS00/18386, 1999, pp. 851-868.

Chen et al., "Source Model for Transform Video Coder and Its Application-Part II: Variable Frame Rate Coding", XP 000687649, IEEE Transactions on Circuits and Systems for Video Technology, vol. 7, No. 2, Apr. 1997.

Haavisto et al., "Motion Adaptive Scan Rate Up-Conversion", Multidimensional Systems and Signal Processing, XP 000573419, vol. 3, Search Report PCTUS00/18386 & PCTUS00/18390, 1992, pp. 113-130.

Han et al., "Frame-rate Up-conversion Using Transmitted Motion and Segmentation Fields for Very Low Bit-rate Video Coding" Proceedings for ICIP (International Conference on Image Processing), 1997, pp. 747-750.

Haskell et al., "Motion Compensation Modes in MPEG", Digital Video: An Introduction to MPEG-2, Chapter 7, Kluwer Academic Publishers, XP002153352, 1997.

Kim et al., "Local Motion-Adaptive Interpolation Technique Based on Block Matching Algorithms", Signal Processing Image Communication, No. 6, Amsterdam, Nov. 1992.

Kiranyaz et al., "Motion Compensated Frame Interpolation Techniques for VLBR Video Coding" Proceedings for ICIP (International Conference on Image Processing), 1997.

Kokaram et al., "Detection and Removal of Impulsive Noise in Image Sequences", Proceedings of the Singapore International Conference on Image Processing, Singapore, Sep. 1992.

Kronander, "Post and Pre-Processing in Coding of Image Sequences Using Filters with Motion Compensated History", International Conference on Acoustics, Speech, and Signal Processing, New York City, Apr. 1988.

Migliorati et al., "Multistage Motion Estimation for Image Interpolation", Signal Processing Image Communication, vol. 7, 1995, pp. 187-199.

Poynton, "A Technical Introduction to Digital Video", John Wiley & Sons, 1996, pp. 8-11.

Sallent, "Simulation of a Teleconference Codec for ISDN", Proceedings of the European Signal Proceeding Conference, vol. 5, Amsterdam, Sep. 1990.

Sato et al., "Video OCR for Digital News Archive", IEEE International Workshop on Content-Based Access of Image and Video Database, XP002149702, 1998, pp. 52-60.

(56) References Cited

OTHER PUBLICATIONS

Stallings et al., Business Data Communications, Third Edition, Prentice-Hall, Chapter 2, 1998.

Thomas, "A Comparison of Motion-Compensated Interlace-to-Progressive Conversion Methods", Signal Processing Image Communication, vol. 12, 1998, pp. 209-229.

* cited by examiner

SYSTEM AND METHOD FOR INTRACODING VIDEO DATA

CROSS REFERENCE TO RELATED APPLICATIONS

This is a divisonal of U.S. patent application Ser. No. 13/679,957, filed on Nov. 16, 2012, which is continuation of U.S. patent application Ser. No. 12/767,744, filed on Apr. 26, 2010, now patented as U.S. Pat. No. 8,385,415, issued on Feb. 26, 2013, which is continuation of U.S. patent application Ser. No. 10/848,992, filed on May 18, 2004, now patented as U.S. Pat. No. 7,706,444, issued on Apr. 27, 2010, which is a continuation of U.S. patent application Ser. No. 09/732,522, filed on Dec. 6, 2000, now patented as U.S. Pat. No. 6,765,964, issued on Dec. 6, 2000, which is hereby incorporated by reference in its entirety.

BACKGROUND OF THE INVENTION

1. Field of the Invention

The invention pertains to a video system that compresses video data for transmission or storage and decompresses the video data for display. More particularly, the invention pertains to a video system and a method for intracoding video data.

2. Description of the Related Art

Video systems transmit, process and store large quantities of video data. To create a video presentation, such as a video movie, a rendering video system displays the video data as a plurality of digital images, also referred to as "frames," thereby simulating movement. In order to achieve a video presentation with an acceptable video quality, or to enable transmission and storage at all, a conventional video system modifies the video data prior to transmission or storage. For instance, the video system compresses and encodes the video data to reduce the bit rate for storage and transmission.

In a conventional video system a video encoder is used to compress and encode the video data and a video decoder is used to decompress and to decode the video data. The video encoder outputs video data that has a reduced bit rate and a reduced redundancy. That is, the technique of video compression removes spatial redundancy within a video frame or temporal redundancy between consecutive video frames.

The video encoder and video decoder may be configured to apply one of two types of coding to compress the video stream, namely intracoding and intercoding. These two types of coding are based on the statistical properties of the video frames. When the video frames are coded using intracoding, the compression is based on information contained in a single frame (the frame that is compressed) by using the spatial redundancy within the frame. Intracoding, thus, does not depend on any other frames. In contrast, intercoding uses at least one other frame as a reference and codes a difference between the frame to be compressed and the reference frame. Intercoding is thus based on a temporal redundancy between consecutive frames in the video data.

The field of video compression is subject to international standards, e.g., International Telecommunications Union (ITU) standard H.263 that defines uniform requirements for video coding and decoding. In addition, manufacturers of video coders and decoders modify or build upon the international standards and implement proprietary techniques for video compression.

Despite the existence of the international standards and the proprietary techniques, there is still a need for improved techniques for video compression. For example, as the quality of a displayed video movie depends directly from the technique used for video compression, any improvement of the video compression technique makes the video movie more pleasing for the viewer.

SUMMARY OF THE INVENTION

An aspect of the invention involves a method of coding a stream of video data including a stream of video frames. The method divides each video frame into a matrix of a plurality of subblocks, wherein each subblock includes a plurality of pixels. The method further defines nine prediction modes, wherein each prediction mode determines a mode according to which a present subblock is to be coded. The method further selects one of the nine prediction modes to encode the present subblock. The selected prediction mode provides for a minimum error value in the present subblock.

Another aspect of the invention involves a video system for coding and decoding a stream of video data that includes a stream of video frames. The video system includes a video encoder and a mode selector. The video encoder is configured to receive a stream of video data including a stream of video frames and to divide each video frame into a matrix of a plurality of subblocks, wherein each subblock includes a plurality of pixels. The mode selector is in communication with the video encoder and is configured to define nine prediction modes. Each prediction mode determines a mode according to which a present subblock is to be coded. The mode selector is further configured to select one of the nine prediction modes to encode the present subblock, wherein the selected prediction mode provides for a minimum error value in the present subblock.

Once the video system has selected the best prediction mode to encode the pixels of the present subblock, the video system encodes the minimum error value and transmits the encoded minimum error value within a compressed bitstream to the decoder. The minimum error value represents a difference between predicted pixels of the present subblock and the original pixels of the subblock. The decoder uses the predicted pixels and the difference to the original pixels to accurately reconstruct the video frame.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION OF THE PREFERRED EMBODIMENT

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, well-known methods, procedures, components, and devices have not been described in detail so as not to unnecessarily obscure aspects of the present invention.

Figure 1:
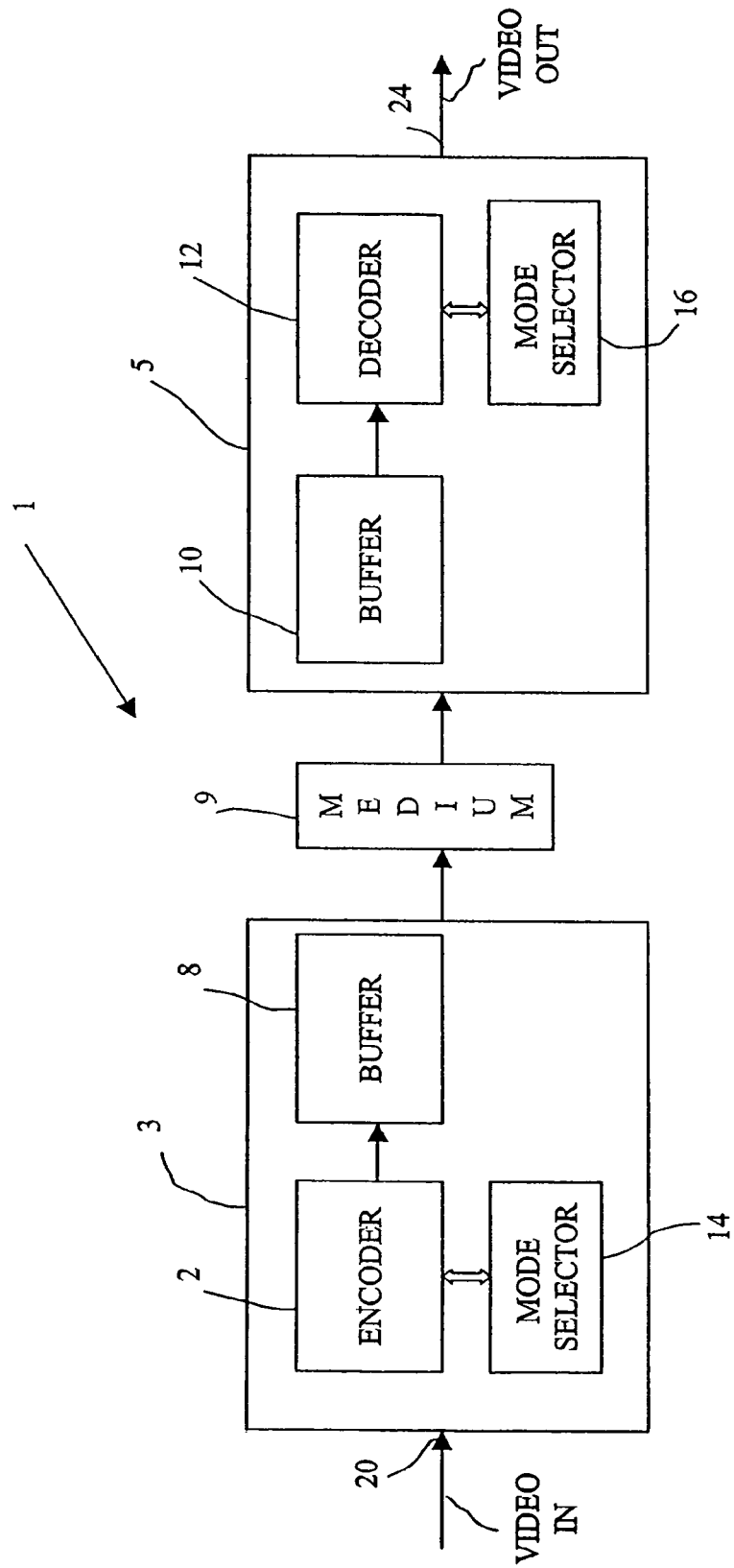
FIG. 1 is a high-level block diagram of a system for video applications having an encoding side and a decoding side.

FIG. 1 is a high-level block diagram of a video compression and decompression system 1 (hereinafter "video system 1") having an encoder apparatus 3 and a decoder apparatus 5 that is coupled to the encoder apparatus 3 through a medium 9. The encoder apparatus 3 includes a video encoder 2, a mode selector 14 and a buffer 8. The decoder apparatus 5 includes a buffer 10, a video decoder 12 and a mode selector 16. The encoder apparatus 3 receives a video sequence 20 (VIDEO IN) and encodes the video sequence 20 to generate an encoded and thus compressed representation in one of a number of possible formats. The format may be in an interleaved format tailored for "live" streaming of the encoded representation. The format may also be in a single file format in which each of the encoded representation is stored in a contiguous block within one file.

The video sequence 20 input to the encoder apparatus 3 may be either a live signal, e.g., provided by a video camera, or a prerecorded sequence in a predetermined format. The video sequence 20 includes frames of a digital video, an audio segment consisting of digital audio, combinations of video, graphics, text, and/or audio (multimedia applications), or analog forms of the aforementioned. If necessary, conversions can be applied to various types of input signals such as analog video, or previously compressed and encoded video to produce an appropriate input to the encoder apparatus 3. In one embodiment, the encoder apparatus 3 may accept video in RGB or YUV formats. The encoder apparatus 3, however, may be adapted to accept any format of input as long as an appropriate conversion mechanism is supplied. Conversion mechanisms for converting a signal in one format to a signal in another format are well known in the art.

The medium 9 may be a storage device or a transmission medium. In one embodiment, the video system 1 may be implemented on a computer. The encoder apparatus 3 sends an encoded video stream (representation) to the medium 9 that is implemented as a storage device. The storage device may be a video server, a hard disk drive, a CD rewriteable drive, a read/write DVD drive, or any other device capable of storing and allowing the retrieval of encoded video data. The storage device is connected to the decoder apparatus 5, which can selectively read from the storage device and decode the encoded video sequence. As the decoder apparatus 5 decodes a selected one of the encoded video sequence, it generates a reproduction of the video sequence 20, for example, for display on a computer monitor or screen.

In another embodiment, the medium 9 provides a connection to another computer, which may be a remote computer, that receives the encoded video sequence. The medium 9 may be a network connection such as a LAN, a WAN, the Internet, or the like. The decoder apparatus 5 within the remote computer decodes the encoded representations contained therein and may generate a reproduction of the video sequence 20 on a screen or a monitor of the remote computer.

Aspects of the video system 1 illustrated in FIG. 1 and described above can be combined and supplemented to achieve other embodiments. Numerous other implementations are consistent with the scope of this invention. Such other implementations need not be restricted to video, but may include audio or other forms of media as well.

Pre-existing video encoding techniques typically break up a frame (picture) into smaller blocks of pixels called macroblocks. Each macroblock can consist of a matrix of pixels, typically a 16×16 matrix, defining the unit of information at which encoding is performed. The matrix of pixels is therefore referred to as a 16×16 macroblock. These video encoding techniques usually break each 16×16 macroblock further up into smaller matrices of pixels. For example, into 8×8 matrices of pixels or 4×4 matrices of pixels. Such matrices are hereinafter referred to as subblocks. In one embodiment of the present invention, a 16×16 macroblock is divided into 16 4×4 subblocks. Those skilled in the art will appreciate that the present invention is equally applicable to systems that use 8×8 subblocks, 4×4 subblocks or only 16×16 macroblocks without breaking it up into subblocks.

Further, the pre-existing encoding techniques provide for motion compensation and motion estimation using motion vectors. The motion vectors describe the direction, expressed through an x-component and a y-component, and the amount of motion of the 16×16 macroblocks, or their respective subblocks, and are transmitted to the decoder as part of the bit stream. Motion vectors are used for bidirectionally encoded pictures (B-pictures) and predicted pictures (P pictures) as known in the art.

The video encoder 2 performs a discrete cosine transform (DCT) to encode and compress the video sequence 20. Briefly, the video encoder 2 converts the video sequence 20 from the spacial, temporal domain into the frequency domain. The output of the video encoder 2 is a set of signal amplitudes, called "DCT coefficients." A quantizer receives the DCT coefficients and assigns each of a range (or step size) of DCT coefficient values a single value, such as a small integer, during encoding. Quantization allows data to be represented more compactly, but results in the loss of some data. Quantization on a finer scale results in a less compact representation (higher bit-rate), but also involves the loss of less data. Quantization on a more coarse scale results in a more compact representation (lower bit-rate), but also involves more loss of data. The mode selector 14 communicates with the video encoder 2 and monitors and controls encoding of the video sequence 20. The mode selector 14 determines in accordance with the present invention prediction modes according to which the video encoder 2 encodes the video sequence 20. The mode selector 14 may be a processor or a software module that are configured to operates in accordance with a method of the present invention. FIG. 1 shows the mode selector 14 for illustrative purposes as an element separate from the video encoder 2. Those skilled in the art will appreciate that the functionality of the mode selector 14 may be combined with the functionality of the video encoder 2.

The buffer 8 of the encoder apparatus 3 receives the encoded and compressed video sequence (hereinafter "encoded video sequence") from the video encoder 2 and adjusts the bit rate of the encoded video sequence before it is sent to the medium 9. Buffering may be required because individual video images may contain varying amounts of information, resulting in varying coding efficiencies from image to image. As the buffer 8 has a limited size, a feedback loop to the quantizer may be used to avoid overflow or underflow of the buffer 8. The bit-rate of the representation is the rate at which the representation data must be processed in order to present the representation in real time.

The decoder apparatus 5 performs the inverse function of the encoder apparatus 3. The buffer 10 serves also to adjust the bit rate of the incoming encoded video sequence. The video decoder 12 decodes and decompresses in combination with the mode selector 16 the incoming video sequence reconstructing the video sequence. The mode selector 16 determines the prediction modes according to which the video encoder 2 encoded the incoming video sequence. The decoder apparatus 5 outputs a decoded and decompressed video sequence 24 illustrated as "VIDEO OUT" (hereinafter "decoded video sequence 24").

The video decoder 12 receives a bit stream that represents the encoded video sequence from the buffer 10 (FIG. 1). In one embodiment, the video decoder is a conventional video decoder, e.g., a MPEG-2 decoder, that includes a decoder controller, a VLC decoder (Variable Length Coding, VLC) and a reconstruction module. The operation and function of these components are known to those skilled in the art. These components are known to those skilled in the art and described in generally available MPEG documents and publications.

Figure 2:
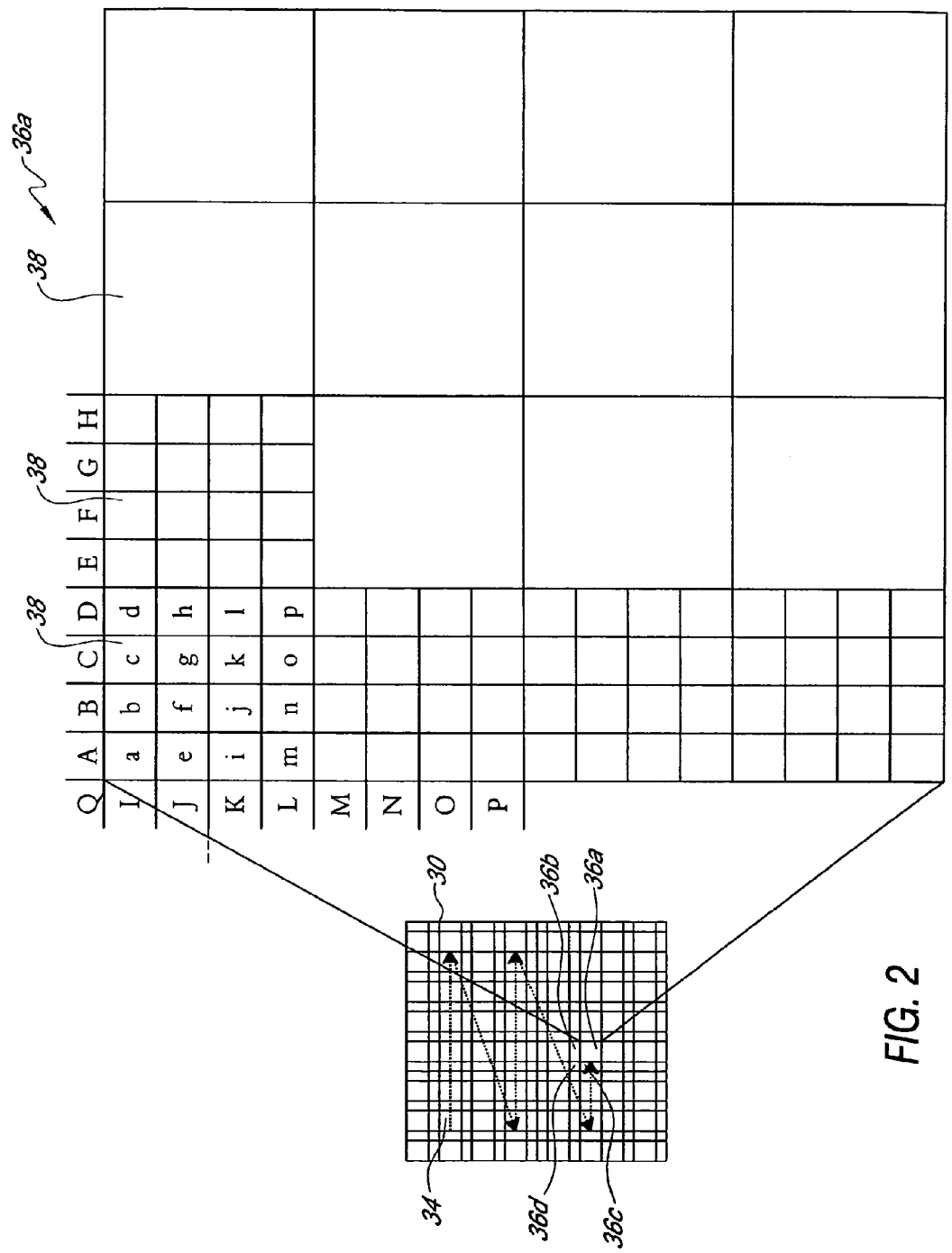
FIG. 2 is a high-level illustration of a frame and its division in macroblocks and subblocks.

FIG. 2 is a diagram illustrating a video frame 30 that is part of the video sequence 20. As described above, known video encoding techniques typically break up a video frame 30 into macroblocks 36, 36a, 36b, 36c, 36d. For example, the video frame 30 is divided into a matrix of 16×16 macroblocks 36, 36a, 36b, 36c, 36d. The video system 1 encodes the macroblocks 36, 36a, 36b, 36c, 36d line by line, from top to bottom and from left to right, as indicated through a dashed line 34 that illustrates the sequence of, e.g., intra encoding. In the illustrated embodiment, the dashed line 34 ends at the macroblock 36a, which is the next macroblock to be encoded. All prior macroblocks 36, 36b, 36c, 36d have already been encoded.

The macroblock 36a, as a representative for all macroblocks 36, 36a, 36b, 36c, 36d, is shown in greater detail below the video frame 30. The video encoding technique of the video system 1 breaks each macroblock 36, 36a, 36b, 36c, 36d further up into a matrix of pixels 38, hereinafter referred to as a subblock 38. In one embodiment, the subblock 38 is a 4×4 matrix of pixels, wherein the 16 pixels are labeled as a, b, c, . . . , p. Bordering pixels of an adjacent subblock of a neighboring macroblock 36b, which is located above the macroblock 36a, are labeled as A, B, C, D. Further, bordering pixels of a subblock located above and to the right of the macroblock 36a are labeled as E, F, G, H. Likewise, bordering pixels of an adjacent subblock of a neighboring macroblock 36c, which is located to the left of the macroblock 36a, are labeled as I, J, K, L. Bordering pixels of a subblock located below and to the left of the macroblock 36a are labeled as M, N, O, P. A bordering pixel of a subblock of a macroblock 36d, which is located above and to the left of the macroblock 36a, is labeled as Q.

The video system 1 of the present invention codes each macroblock 36 as an intra macroblock. Intra macroblocks are transform encoded without motion compensated prediction. Thus, intra macroblocks do not reference decoded data from either previous or subsequent frames. An I-frame is a frame consisting completely of intra macroblocks. Thus, I-frames are encoded with no reference to previous or subsequent frames. I-frames are also known as "Intra-frames."

Figure 3:
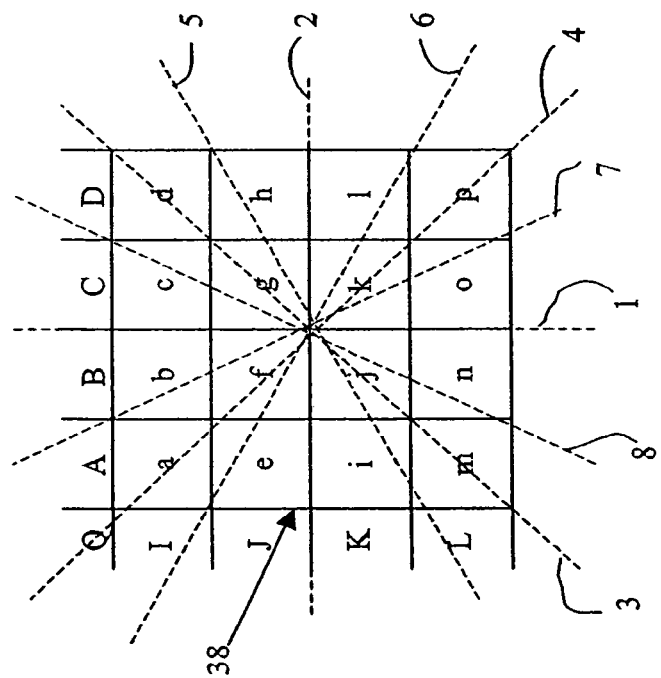
FIG. 3 is a subblock illustrating the directions according to which the subblock can be encoded, wherein each direction represents one of eight prediction modes in accordance with the present invention.

FIG. 3 is a subblock 38 illustrating possible directions according to which the subblock 38 may be encoded. In accordance with the present invention, the subblocks of a macroblock 36, 36a, 36b, 36c, 36d can be intra coded in one of nine modes (Modes 0, Mode 1, . . . , Mode 9) as listed hereinafter. That is, a particular subblock 38 may be predicted from a subblock above the current subblock that is currently decoded ("vertical prediction"), from the subblock to the left of the current subblock ("horizontal prediction"), or from both the left and the above subblocks ("diagonal prediction"). The Modes 1-8 predict the subblock in a predetermined direction and the Mode 0 uses a uniform average without prediction in a predetermined direction. In FIG. 3, each direction represents one of the eight prediction modes in accordance with the present invention.

Mode 0:

In this mode, each pixel a-p is predicted by the following equation:

$$a, b, c, d, \ldots, p = \frac{A + B + C + D + I + J + K + L + 4}{8}.$$

It is contemplated that in this mode as well as in the following modes, a "division" means to round the result down toward "minus infinity" ($-\infty$). For instance, in mode 0, the term "+4" ensures that the division results in a rounding to the nearest integer. This applies also the other modes.

If four of the pixels A-P are outside the current picture (frame) that is currently encoded, the average of the remaining four pixels is used for prediction. If all eight pixels are outside the picture, the prediction for all pixels in this subblock is 128. A subblock may therefore always be predicted in mode 0.

Mode 1:

If the pixels A, B, C, D are inside the current picture, the pixels a-p are predicted in vertical direction as shown in FIG. 3. That is, the pixels a-p are predicted as follows:

| | |
|---|---|
| a, e, i, m = | A |
| b, f, j, n = | B |
| c, g, k, o = | C |
| d, h, l, p = | D |

Mode 2:

If the pixels I, J, K, L are inside the current picture, the pixels a-p are predicted in horizontal direction. That is, the pixels a-p are predicted as follows:

| | |
|---|---|
| a, b, c, d = | I |
| e, f, g, h = | J |
| i, j, k, l = | K |
| m, n, o, p = | L |

Mode 3:

This mode is used if all pixels A-P are inside the current picture. This corresponds to a prediction in a diagonal direction as shown in FIG. 3. The pixels a-p are predicted as follows:

| | |
|---|---|
| m = | (J + 2K + L + 2)/4 |
| i, n = | (I + 2J + K + 2)/4 |
| e, j, o = | (Q + 2I + J + 2)/4 |
| a, f, k, p = | (I + 2Q + A + 2)/4 |
| b, g, l = | (Q + 2A + B + 2)/4 |
| c, h = | (A + 2B + C + 2)/4 |
| d = | (B + 2C + D + 2)/4 |

Mode 4:

This mode is used if all pixels A-P are inside the current picture. This is also a diagonal prediction.

| | |
|---|---|
| a = | (A + 2B + C + I + 2J + K + 4)/8 |
| b, e = | (B + 2C + D + J + 2K + L + 4)/8 |
| c, f, i = | (C + 2D + E + K + 2L + M + 4)/8 |
| d, g, j, m = | (D + 2E + F + L + 2M + N + 4)/8 |
| h, k, n = | (E + 2F + G + M + 2N + O + 4)/8 |
| l, o = | (F + 2G + H + N + 2O + P + 4)/8 |
| p = | (G + H + O + P + 2)/4 |

Mode 5:

This mode is used if all pixels A-P are inside the current picture. This is also a diagonal prediction.

| | |
|---|---|
| a, j = | (Q + A + 1)/2 |
| b, k = | (A + B + 1)/2 |
| c, l = | (B + C + 1)/2 |
| d = | (C + D + 1)/2 |
| e, n = | (I + 2Q + A + 2)/4 |
| f, o = | (Q + 2A + B + 2)/4 |
| g, p = | (A + 2B + C + 2)/4 |
| h = | (B + 2C + D + 2)/4 |
| i = | (Q + 2I + J + 2)/4 |
| m = | (I + 2J + K + 2)/4 |

Mode 6:

This mode is used if all pixels A-P are inside the current picture. This is a diagonal prediction.

| | |
|---|---|
| a = | (2A + 2B + J + 2K + L + 4)/8 |
| b, i = | (B + C + 1)/2 |
| c, j = | (C + D + 1)/2 |
| d, k = | (D + E + 1)/2 |
| l = | (E + F + 1)/2 |
| e = | (A + 2B + C + K + 2L + M + 4)/8 |
| f, m = | (B + 2C + D + 2)/4 |
| g, n = | (C + 2D + E + 2)/4 |
| h, o = | (D + 2E + F + 2)/4 |
| p = | (E + 2F + G + 2)/4 |

Mode 7:

This mode is used if all pixels A-P are inside the current picture. This is a diagonal prediction.

| | |
|---|---|
| a = | (B + 2C + D + 2I + 2J + 4)/8 |
| b = | (C + 2D + E + I + 2J + K + 4)/8 |
| c, e = | (D + 2E + F + 2J + 2K + 4)/8 |
| d, f = | (E + 2F + G + J + 2K + L + 4)/8 |
| g, i = | (F + 2G + H + 2K + 2L + 4)/8 |
| h, j = | (G + 3H + K + 2L + M + 4)/8 |
| k, m = | (G + H + L + M + 2)/4 |
| l, n = | (L + 2M + N + 2)/4 |
| o = | (M + N + 1)/2 |
| p = | (M + 2N + O + 2)/2 |

Mode 8:

This mode is used if all pixels A-P are inside the current picture. This is a diagonal prediction.

| | |
|---|---|
| a, g = | (Q + I + 1)/2 |
| b, h = | (I + 2Q + A + 2)/4 |
| c = | (Q + 2A + B + 2)/4 |
| d = | (A + 2B + C + 2)/4 |
| e, k = | (I + J + 1)/2 |
| f, l = | (Q + 2I + J + 2)/4 |
| i, o = | (J + K + 1)/2 |
| j, p = | (I + 2J + K + 2)/4 |
| m = | (K + L + 1)/2 |
| n = | (J + 2K + L + 2)/2 |

In one embodiment of the present invention, a mode selection algorithm determines a criteria to select one of the nine modes. The subblock 38 is then encoded in accordance with the selected mode. The mode selection algorithm is described in detail below.

Figure 4:
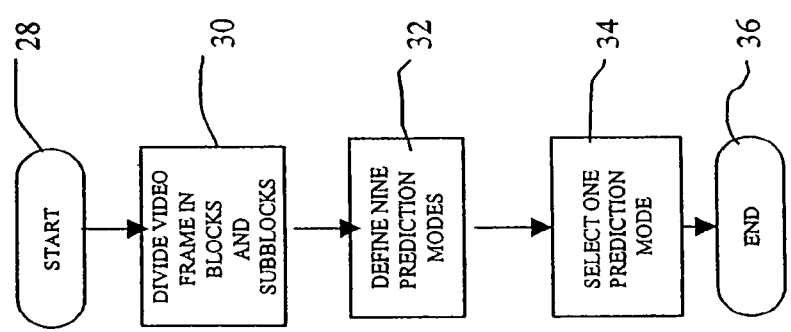
FIG. 4 is a flow chart in accordance with an embodiment of the present invention that selects a prediction mode.

FIG. 4 is a flow chart of a procedure illustrating the method in accordance with the present invention that codes video data including a stream of video frames and that selects one of the prediction modes Modes 0-8. In one embodiment, the method codes a luminance portion (Y) of a video frame.

In a step 28, e.g., when a user activates the video system 1, the procedure initializes the video system 1. The initialization procedure includes, for example, determining whether the encoder apparatus 3 is operating and properly connected to receive the stream of video frames.

In a step 30, the procedure receives the stream of video frames and divides each video frame into a matrix of a plurality of subblocks, wherein each subblock includes a plurality of pixels. The matrix of a plurality of subblocks may include 4x4 subblocks 38 that are part of a macroblock as described above.

In a step 32, the procedure defines the nine prediction modes Mode 0-8, wherein each prediction mode determines a mode according to which a present subblock is to be coded. For example, the procedure may execute a subroutine to calculate and define the modes Mode 0-8.

In a step 34, the procedure selects one of the nine prediction modes Mode 0-8 to encode the present subblock 38. In one embodiment, the procedure calculates for each mode an error value, determines which mode provides a minimum error value and selects that mode for encoding the present subblock 38.

Once the procedure has selected the "best" prediction mode to encode the pixels of the present subblock 38, the procedure encodes the minimum error value and transmits the encoded minimum error value within a compressed bitstream to the decoder. The minimum error value represents a difference between the predicted pixels of the present subblock and the original pixels of the subblock. The difference may be encoded using a DCT, coefficient quantization and variable length coding as known in the art. The decoder uses the predicted pixels and the difference to the original pixels to accurately reconstruct the video frame. The procedure ends at a step 36.

The procedure provides that each of the 4x4 subblocks 38 is coded in accordance with one of the nine prediction modes Mode 0-8. As this may require a considerable number of bits if coded directly, the video system 1 in accordance with the present invention may apply a more efficient way of coding the mode information. A prediction mode of a subblock is correlated with the prediction modes of adjacent subblocks.

Figure 5:
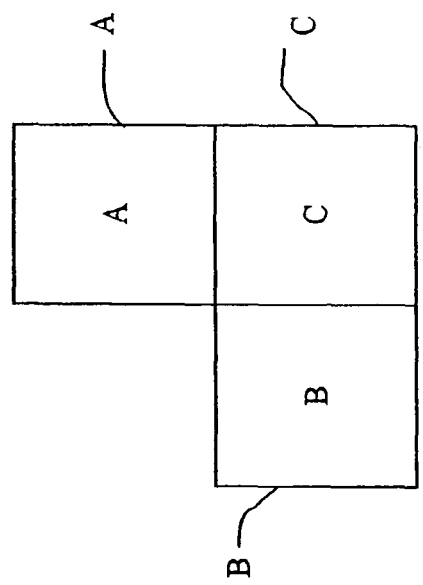
FIG. 5 is an illustration of three neighboring subblocks, wherein two subblocks are used to encode the third subblock.

FIG. 5 illustrates this through three exemplary subblocks A, B, C. The subblock C is the subblock that is to be encoded (predicted) with the help of the subblocks A, B whose prediction modes are known. The subblock A is located above the subblock C and the subblock B is located left of the subblock C. In this case, an ordering of the most probable, next most probable etc. prediction mode for the subblock C is given. An example of such an ordering table is listed hereinafter. The table is divided into ten groups (Group 1-Group 10). In each group, the respective prediction mode for the subblock A is constant (e.g., Mode 0 of the subblock A is constant in Group 2), and the prediction mode for the subblock B varies. That is, the (constant) prediction mode for the subblock A within a group may be combined with one of the nine prediction modes for the subblock B within that group.

For each combination of the prediction modes of the subblocks A and B, a sequence of nine numbers is given, one number for each of the nine Modes 0-9. For example in Group 3, if the prediction modes for the subblock A and the subblock B are both Mode 1, a string "1 6 2 5 3 0 4 8 7" indicates that the Mode 1, i.e., the first number in the string, is the most probable mode for the subblock C. The Mode 6, i.e., the second number in the string, is the next most probable mode. In the exemplary string, the Mode 7 is the least probable since the number 7 is the last number in the string. The string will be part of the stream of bits that represents the encoded video sequence.

The stream of bits therefore includes information (Prob0=1 (see Table 1)) indicating the mode used for the subblock C. For example, the information may indicate that the next most probable intra prediction mode is Mode 6. Note that a "-" in the table indicates that this instance cannot occur. The term "outside" used in the Table 1 indicates "outside the frame." If the subblock A or B is within the frame, but is not INTRA coded (e.g., in a P frame, the subblock C could be INTRA coded but either the subblock A or the subblock B may not be INTRA coded), there is no prediction mode. The procedure of the present invention assumes the Mode 0 for such subblocks.

TABLE 1

| B | A = outside | |
|---|---|---|
| outside | 0 - - - - - - - - | |
| mode 0 | 0 2 - - - - - - - | |
| mode 1 | - - - - - - - - - | |
| mode 2 | 2 0 - - - - - - - | |
| mode 3 | - - - - - - - - - | GROUP 1 |
| mode 4 | - - - - - - - - - | |
| mode 5 | - - - - - - - - - | |
| mode 6 | - - - - - - - - - | |
| mode 7 | - - - - - - - - - | |
| mode 8 | - - - - - - - - - | |
| B | A = mode 0 | |
| outside | 0 1 - - - - - - - | |
| mode 0 | 0 2 1 6 4 8 5 7 3 | |
| mode 1 | 1 0 2 6 5 4 3 8 7 | |
| mode 2 | 2 8 0 1 7 4 3 6 5 | |
| mode 3 | 2 0 1 3 8 5 4 7 6 | GROUP 2 |
| mode 4 | 2 0 1 4 6 7 8 3 5 | |
| mode 5 | 0 1 5 2 6 3 8 4 7 | |
| mode 6 | 0 1 6 2 4 7 5 8 3 | |
| mode 7 | 2 7 0 1 4 8 6 3 5 | |
| mode 8 | 2 8 0 1 7 3 4 5 6 | |
| B | A = mode 1 | |
| outside | 1 0 - - - - - - - | |
| mode 0 | 1 2 5 6 3 0 4 8 7 | |
| mode 1 | 1 6 2 5 3 0 4 8 7 | |
| mode 2 | 2 1 7 6 8 3 5 0 4 | |
| mode 3 | 1 2 5 3 6 8 4 7 0 | GROUP 3 |
| mode 4 | 1 6 2 0 4 5 8 7 3 | |
| mode 5 | 1 5 2 6 3 8 4 0 7 | |
| mode 6 | 1 6 0 2 4 5 7 3 8 | |
| mode 7 | 2 1 7 6 0 8 5 4 3 | |
| mode 8 | 1 2 7 8 3 4 5 6 0 | |
| B | A = mode 2 | |
| outside | - - - - - - - - - | |
| mode 0 | 0 2 1 8 7 6 5 4 3 | |
| mode 1 | 1 2 0 6 5 7 4 8 3 | |
| mode 2 | 2 8 7 1 0 6 4 3 5 | |
| mode 3 | 2 0 8 1 3 7 5 4 6 | GROUP 4 |
| mode 4 | 2 0 4 1 7 8 6 3 5 | |
| mode 5 | 2 0 1 5 8 4 6 7 3 | |
| mode 6 | 2 0 6 1 4 7 8 5 3 | |
| mode 7 | 2 7 8 1 0 5 4 6 3 | |
| mode 8 | 2 8 7 1 0 4 3 6 5 | |
| B | A = mode 3 | |
| outside | - - - - - - - - - | |
| mode 0 | 0 2 1 3 5 8 6 4 7 | |
| mode 1 | 1 0 2 5 3 6 4 8 7 | |
| mode 2 | 2 8 1 0 3 5 7 6 4 | |
| mode 3 | 3 2 5 8 1 4 6 7 0 | GROUP 5 |
| mode 4 | 4 2 0 6 1 5 8 3 7 | |
| mode 5 | 5 3 1 2 8 6 4 0 7 | |
| mode 6 | 1 6 0 2 4 5 8 3 7 | |
| mode 7 | 2 7 0 1 5 4 8 6 3 | |
| mode 8 | 2 8 3 5 1 0 7 6 4 | |
| B | A = mode 4 | |
| outside | - - - - - - - - - | |
| mode 0 | 2 0 6 1 4 7 5 8 3 | |
| mode 1 | 1 6 2 0 4 5 3 7 8 | |
| mode 2 | 2 8 7 6 4 0 1 5 3 | |
| mode 3 | 4 2 1 0 6 8 3 5 7 | GROUP 6 |
| mode 4 | 4 2 6 0 1 5 7 8 3 | |
| mode 5 | 1 2 5 0 6 3 4 7 8 | |
| mode 6 | 6 4 0 1 2 7 5 3 8 | |
| mode 7 | 2 7 4 6 0 1 8 5 3 | |
| mode 8 | 2 8 7 4 6 1 3 5 0 | |
| B | A = mode 5 | |
| outside | - - - - - - - - - | |
| mode 0 | 5 1 2 3 6 8 0 4 7 | |
| mode 1 | 1 5 6 3 2 0 4 8 7 | |
| mode 2 | 2 1 5 3 6 8 7 4 0 | |
| mode 3 | 5 3 1 2 6 8 4 7 0 | GROUP 7 |
| mode 4 | 1 6 2 4 5 8 0 3 7 | |
| mode 5 | 5 1 3 6 2 0 8 4 7 | |
| mode 6 | 1 6 5 2 0 4 3 7 8 | |
| mode 7 | 2 7 1 6 5 0 8 3 4 | |
| mode 8 | 2 5 1 3 6 8 4 0 7 | |
| B | A = mode 6 | |
| outside | - - - - - - - - - | |
| mode 0 | 1 6 2 0 5 4 3 7 8 | |
| mode 1 | 1 6 5 4 2 3 0 7 8 | |
| mode 2 | 2 1 6 7 4 8 5 3 0 | |
| mode 3 | 2 1 6 5 8 4 3 0 7 | GROUP 8 |
| mode 4 | 6 4 1 2 0 5 7 8 3 | |
| mode 5 | 1 6 5 2 3 0 4 8 7 | |
| mode 6 | 6 1 4 0 2 7 5 3 8 | |
| mode 7 | 2 7 4 6 1 5 0 8 3 | |
| mode 8 | 2 1 6 8 4 7 3 5 0 | |
| B | A = mode 7 | |
| outside | - - - - - - - - - | |
| mode 0 | 2 0 4 7 6 1 8 5 3 | |
| mode 1 | 6 1 2 0 4 7 5 8 3 | |
| mode 2 | 2 7 8 0 1 6 4 3 5 | |
| mode 3 | 2 4 0 8 3 1 7 6 5 | GROUP 9 |
| mode 4 | 4 2 7 0 6 1 8 5 3 | |
| mode 5 | 2 1 0 8 5 6 7 4 3 | |
| mode 6 | 2 6 4 1 7 0 5 8 3 | |
| mode 7 | 2 7 4 0 8 6 1 5 3 | |
| mode 8 | 2 8 7 4 1 0 3 6 5 | |
| B | A = mode 8 | |
| outside | - - - - - - - - - | |
| mode 0 | 2 0 8 1 3 4 6 5 7 | |
| mode 1 | 1 2 0 6 8 5 7 3 4 | |
| mode 2 | 2 8 7 1 0 3 6 5 4 | |
| mode 3 | 8 3 2 5 1 0 4 7 6 | GROUP 10 |
| mode 4 | 2 0 4 8 5 1 7 6 3 | |
| mode 5 | 2 1 0 8 5 3 6 4 7 | |

TABLE 1-continued

| | |
|---|---|
| mode 6 | 2 1 6 0 8 4 5 7 3 |
| mode 7 | 2 7 8 4 0 6 1 5 3 |
| mode 8 | 2 8 3 0 7 4 1 6 5 |

The information about the prediction modes may be efficiently coded by combining prediction mode information of two subblocks 38 in one codeword. The stream of bits includes then the resulting codewords, wherein each codeword represents the prediction modes of the two subblocks. Table 2 lists exemplary binary codewords for code numbers (Code No.) between 0 and 80. The probability of a mode of the first subblock is indicated as Prob0 and the probability of a mode of the second subblock is indicated as Prob1.

TABLE 2

| Code No. | Prob0 | Prob1 | Codeword |
|---|---|---|---|
| 0 | 0 | 0 | 1 |
| 1 | 0 | 1 | 001 |
| 2 | 1 | 0 | 011 |
| 3 | 1 | 1 | 00001 |
| 4 | 0 | 2 | 00011 |
| 5 | 2 | 0 | 01001 |
| 6 | 0 | 3 | 01011 |
| 7 | 3 | 0 | 0000001 |
| 8 | 1 | 2 | 0000011 |
| 9 | 2 | 1 | 0001001 |
| 10 | 0 | 4 | 0001011 |
| 11 | 4 | 0 | 0100001 |
| 12 | 3 | 1 | 0100011 |
| 13 | 1 | 3 | 0101001 |
| 14 | 0 | 5 | 0101011 |
| 15 | 5 | 0 | 000000001 |
| 16 | 2 | 2 | 000000011 |
| 17 | 1 | 4 | 000001001 |
| 18 | 4 | 1 | 000001011 |
| 19 | 0 | 6 | 000100001 |
| 20 | 3 | 2 | 000100011 |
| 21 | 1 | 5 | 000101001 |
| 22 | 2 | 3 | 000101011 |
| 23 | 5 | 1 | 010000001 |
| 24 | 6 | 0 | 010000011 |
| 25 | 0 | 7 | 010001001 |
| 26 | 4 | 2 | 010001011 |
| 27 | 2 | 4 | 010100001 |
| 28 | 3 | 3 | 010100011 |
| 29 | 6 | 1 | 010101001 |
| 30 | 1 | 6 | 010101011 |
| 31 | 7 | 0 | 00000000001 |
| 32 | 0 | 8 | 00000000011 |
| 33 | 5 | 2 | 00000001001 |
| 34 | 4 | 3 | 00000001011 |
| 35 | 2 | 5 | 00000100001 |
| 36 | 3 | 4 | 00000100011 |
| 37 | 1 | 7 | 00000101001 |
| 38 | 4 | 4 | 00000101011 |
| 39 | 7 | 1 | 00010000001 |
| 40 | 8 | 0 | 00010000011 |
| 41 | 6 | 2 | 00010001001 |
| 42 | 3 | 5 | 00010001011 |
| 43 | 5 | 3 | 00010100001 |
| 44 | 2 | 6 | 00010100011 |
| 45 | 1 | 8 | 00010101001 |
| 46 | 2 | 7 | 00010101011 |
| 47 | 7 | 2 | 01000000001 |
| 48 | 8 | 1 | 01000000011 |
| 49 | 5 | 4 | 01000001001 |
| 50 | 4 | 5 | 01000001011 |
| 51 | 3 | 6 | 01000100001 |
| 52 | 6 | 3 | 01000100011 |
| 53 | 8 | 2 | 01000101001 |
| 54 | 4 | 6 | 01000101011 |
| 55 | 5 | 5 | 01010000001 |
| 56 | 6 | 4 | 01010000011 |
| 57 | 2 | 8 | 01010001001 |
| 58 | 7 | 3 | 01010001011 |

TABLE 2-continued

| Code No. | Prob0 | Prob1 | Codeword |
|---|---|---|---|
| 59 | 3 | 7 | 01010100001 |
| 60 | 6 | 5 | 01010100011 |
| 61 | 5 | 6 | 01010101001 |
| 62 | 7 | 4 | 01010101011 |
| 63 | 4 | 7 | 0000000000001 |
| 64 | 8 | 3 | 0000000000011 |
| 65 | 3 | 8 | 0000000001001 |
| 66 | 7 | 5 | 0000000001011 |
| 67 | 8 | 4 | 0000000100001 |
| 68 | 5 | 7 | 0000000100011 |
| 69 | 4 | 8 | 0000000101001 |
| 70 | 6 | 6 | 0000000101011 |
| 71 | 7 | 6 | 0000010000001 |
| 72 | 5 | 8 | 0000010000011 |
| 73 | 8 | 5 | 0000010001001 |
| 74 | 6 | 7 | 0000010001011 |
| 75 | 8 | 6 | 0000010100001 |
| 76 | 7 | 7 | 0000010100011 |
| 77 | 6 | 8 | 0000010101001 |
| 78 | 8 | 7 | 0000010101011 |
| 79 | 7 | 8 | 0001000000001 |
| 80 | 8 | 8 | 0001000000011 |

With the nine prediction modes (Table 1) and the probabilities of the modes (Table 1, Table 2), a mode selection algorithm determines the mode according to which a particular subblock is predicted. In one embodiment of the present invention, the algorithm selects the mode using a sum of absolute differences (SAD) between the pixels a-p and the corresponding pixels in the original frame, and the above probabilities of the modes. The SAD and the probability table are used to select the mode for a particular subblock 38. The algorithm calculates a parameter uError for each of the nine possible modes Mode 0-8. The mode that provides the smallest uError is the mode selected for the subblock 38.

The uError is calculated as follows:

$$uError = SAD(\{a, \ldots, p\}, \{original\ frame\}) + rd\_quant[uMBQP] * uProb,$$

where $SAD(\{a, \ldots, p\}, \{original\ frame\})$ is the sum of absolute difference between the pixels a-p and the corresponding pixels in the original frame, where rd_quant[uMBQP] is a table of constant values indexed by a quantization parameter uMBQP. uMBQP is given by const U8 rd_quant[32]={1,1,1,1,1,1,2,2,2,2,3,3,3,4,4, 5,5,6,7,7,8,9,11,12,13,15,17,19,21,24,27,30}; and where uProb is the probability of the mode occurring, provided by the position in the mode probability table (Table 1).

For example, the prediction mode for the subblocks A is the Mode 1 and the prediction mode for the subblock B is the Mode 1. The string "1 6 2 5 3 0 4 8 7" indicates that the Mode 1 is also the most probable mode for the subblock C. The Mode 6 is the second most probable mode, etc. Thus, when the algorithm calculates uError for the Mode 0, the probability uProb is 5. Further, for the Mode 1 the probability uProb is 0, for the Mode 2 the probability uProb is 2, for the Mode 3 the probability uProb is 4, and so forth.

In addition to coding the luminance portion (Y) of the video frame, the video system 1 of the present invention may also predict the chrominance portions (U, V) of the video frame. The chrominance portions may be considered as chrominance planes (U and V-planes). Typically, the chrominance planes (U and V-planes) are a quarter of the size of a luminance plane. Thus, in a 16×16 macroblock a corresponding 8×8 block of pixels exists in both the U and V-planes. These 8×8 blocks are divided into 4×4 blocks. In general, separate prediction modes are not transmitted for chrominance blocks. Instead, the modes transmitted for the Y-plane blocks are used as prediction modes for the U and V-plane blocks.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

The invention claimed is:

1. A method of decoding video data in a computing system, the method comprising:
decoding a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame, a value of a lower left-hand corner pixel of a vertically adjacent subblock of the video frame, and a value of an upper right-hand corner pixel of a horizontally adjacent subblock of the video frame, wherein the diagonal intra prediction mode specifies the predicted value P(a) of the upper left-hand corner pixel of the present subblock according to:

$$P(a)=(I+2Q+A+2)/4$$

wherein I comprises the value of the upper right-hand corner pixel of the horizontally adjacent subblock, wherein Q comprises the value of the lower right-hand corner pixel of the upper left left-hand diagonally adjacent subblock, and wherein A comprises the value of the lower left-hand corner pixel of the vertically adjacent subblock.

2. The method of claim 1, wherein each of the plurality of subblocks comprises a rectangular arrays of pixel locations.

3. A non-transitory computer-readable medium including one or more instructions that, when executed by a machine, cause the machine to:
decode a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame, a value of a lower left-hand corner pixel of a vertically adjacent subblock of the video frame, and a value of an upper right-hand corner pixel of a horizontally adjacent subblock of the video frame, wherein the diagonal intra prediction mode specifies the predicted value P(a) of the upper left-hand corner pixel of the present subblock according to:

$$P(a)=(I+2Q+A+2)/4$$

wherein I comprises the value of the upper right-hand corner pixel of the horizontally adjacent subblock, wherein Q comprises the value of the lower right-hand corner pixel of the upper left left-hand diagonally adjacent subblock, and wherein A comprises the value of the lower left-hand corner pixel of the vertically adjacent subblock.

4. The non-transitory computer-readable medium of claim 3, wherein each of the plurality of subblocks comprises a rectangular array of pixel locations.

5. An apparatus, comprising:
circuitry to receive at least a portion of a bitstream of video data; and
circuitry to decode a present subblock of a video frame of the video data according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame, a value of a lower left-hand corner pixel of a vertically adjacent subblock of the video frame, and a value of an upper right-hand corner pixel of a horizontally adjacent subblock of the video frame, wherein the diagonal intra prediction mode specifies the predicted value P(a) of the upper left-hand corner pixel of the present subblock according to:

$$P(a)=(I+2Q+A+2)/4$$

wherein I comprises the value of the upper right-hand corner pixel of the horizontally adjacent subblock, wherein Q comprises the value of the lower right-hand corner pixel of the upper left left-hand diagonally adjacent subblock, and wherein A comprises the value of the lower left-hand corner pixel of the vertically adjacent subblock.

6. The apparatus of claim 5, wherein each of the plurality of subblocks comprises a rectangular array of pixel locations.

7. The apparatus of claim 5, further comprising at least one of a buffer to store the plurality of pixel values, or a display to display the video frame.

8. A non-transitory computer-readable medium including one or more instructions that, when executed by a machine, cause the machine to:
encode a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame, a value of a lower left-hand corner pixel of a vertically adjacent subblock of the video frame, and a value of an upper right-hand corner pixel of a horizontally adjacent subblock of the video frame, wherein the diagonal intra prediction mode specifies the predicted value P(a) of the upper left-hand corner pixel of the present subblock according to:

$$P(a)=(I+2Q+A+2)/4$$

wherein I comprises the value of the upper right-hand corner pixel of the horizontally adjacent subblock, wherein Q comprises the value of the lower right-hand corner pixel of the upper left left-hand diagonally adjacent subblock, and wherein A comprises the value of the lower left-hand corner pixel of the vertically adjacent subblock.

9. The non-transitory computer-readable medium of claim 8, wherein each of the plurality of subblocks comprises a rectangular array of pixel locations.

10. An apparatus, comprising:
circuitry configured to encode a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame, a value of a lower left-hand corner pixel of a vertically adjacent subblock of the video frame, and a value of an upper right-hand corner pixel of a horizontally adjacent subblock of the video frame, wherein the diagonal intra prediction mode specifies the predicted value P(a) of the upper left-hand corner pixel of the present subblock according to:

$P(a)=(I+2Q+A+2)/4$ wherein I comprises the value of the upper right-hand corner pixel of the horizontally adjacent subblock, wherein Q comprises the value of the lower right-hand corner pixel of the upper left left-hand diagonally adjacent subblock, and wherein A comprises the value of the lower left-hand corner pixel of the vertically adjacent subblock; and
circuitry configured to generate a bitstream, the bitstream including information indicating the diagonal intra prediction mode.

11. The apparatus of claim 10, further comprising a buffer to store the plurality of pixel values.

12. The apparatus of claim 10, wherein each of the plurality of subblocks comprises a rectangular array of pixel locations.

13. A method of decoding video data in a computing system, the method comprising:
decoding a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame and a value of a lower left-hand corner pixel of a vertically adjacent subblock of the video frame, wherein the diagonal intra prediction mode further specifies the wherein the diagonal intra prediction mode specifies the predicted value P(a) of the upper left-hand corner pixel of the present subblock according to:

$P(a)=(Q+A+1)/2$ wherein Q comprises the value of the lower right-hand corner pixel of the upper left-hand diagonally adjacent subblock, and wherein A comprises the value of the lower left-hand corner pixel of the vertically adjacent subblock.

14. The method of claim 13, wherein each of the plurality of subblocks comprises a rectangular arrays of pixel locations.

15. A non-transitory computer-readable medium including one or more instructions that, when executed by a machine, cause the machine to:
decode a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame and a value of a lower left-hand corner pixel of a vertically adjacent subblock of the video frame, wherein the diagonal intra prediction mode specifies the predicted value P(a) of the upper left-hand corner pixel of the present subblock according to:

$P(a)=(Q+A+1)/2$ wherein Q comprises the value of the lower right-hand corner pixel of the upper left-hand diagonally adjacent subblock, and wherein A comprises the value of the lower left-hand corner pixel of the vertically adjacent subblock.

16. The non-transitory computer-readable medium of claim 15, wherein each of the plurality of subblocks comprises a rectangular array of pixel locations.

17. An apparatus, comprising:
circuitry to receive at least a portion of a bitstream of video data; and
circuitry to decode a present subblock of a video frame of the video data according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame and a value of an upper right-hand corner pixel of a horizontally adjacent subblock of the video frame, wherein the diagonal intra prediction mode specifies the predicted value P(a) of the upper left-hand corner pixel of the present subblock according to:

$P(a)=(Q+A+1)/2$ wherein Q comprises the value of the lower right-hand corner pixel of the upper left-hand diagonally adjacent subblock, and wherein A comprises the value of the lower left-hand corner pixel of the vertically adjacent subblock.

18. The apparatus of claim 17, wherein each of the plurality of subblocks comprises a rectangular array of pixel locations.

19. The apparatus of claim 17, further comprising at least one of a buffer to store the plurality of pixel values, or a display to display the video frame.

20. A non-transitory computer-readable medium including one or more instructions that, when executed by a machine, cause the machine to:
encode a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame and a value of a lower left-hand corner pixel of a vertically adjacent subblock of the video frame, wherein the diagonal intra prediction mode specifies the predicted value P(a) of the upper left-hand corner pixel of the present subblock according to:

$$P(a)=(Q+A+1)/2$$

wherein Q comprises the value of the lower right-hand corner pixel of the upper left-hand diagonally adjacent subblock, and wherein A comprises the value of the lower left-hand corner pixel of the vertically adjacent subblock.

21. The non-transitory computer-readable medium of claim 20, wherein each of the plurality of subblocks comprises a rectangular array of pixel locations.

22. An apparatus, comprising:
circuitry configured to encode a present subblock of a video frame according to a diagonal intra prediction mode, wherein the diagonal intra prediction mode specifies a predicted value of an upper left-hand corner pixel of the present subblock based at least in part on a weighted average of a plurality of pixel values, wherein the plurality of pixel values includes a value of a lower right-hand corner pixel of an upper left-hand diagonally adjacent subblock of the video frame and a value of a lower left-hand corner pixel of a vertically adjacent subblock of the video frame, wherein the diagonal intra prediction mode specifies the predicted value P(a) of the upper left-hand corner pixel of the present subblock according to:

$$P(a)=(Q+A+1)/2$$

wherein Q comprises the value of the lower right-hand corner pixel of the upper left-hand diagonally adjacent subblock, and wherein A comprises the value of the lower left-hand corner pixel of the vertically adjacent subblock; and circuitry configured to generate a bitstream, the bitstream including information indicating the diagonal intra prediction mode.

23. The apparatus of claim 22, further comprising a buffer to store the plurality of pixel values.

24. The apparatus of claim 22, wherein each of the plurality of subblocks comprises a rectangular array of pixel locations.

* * * * *